G. CAMPOS.
ELECTRICAL MEASURING INSTRUMENT.
APPLICATION FILED OCT. 10, 1913.
1,201,996.
Patented Oct. 17, 1916.
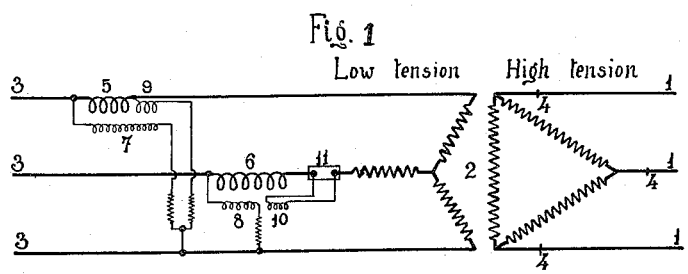
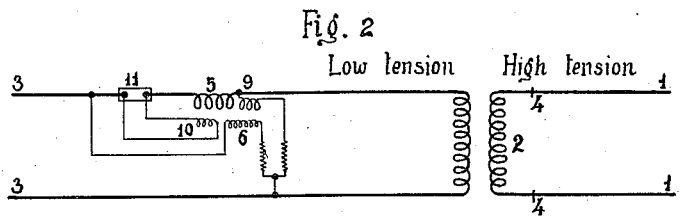

UNITED STATES PATENT OFFICE.

GINO CAMPOS, OF MILAN, ITALY.

ELECTRICAL MEASURING INSTRUMENT.

1,201,996. Specification of Letters Patent. Patented Oct. 17, 1916.

Application filed October 10, 1913. Serial No. 794,438.

*To all whom it may concern:*

Be it known that I, GINO CAMPOS, a subject of the Emperor of Austria-Hungary, residing at Milan, Kingdom of Italy, have invented certain new and useful Improvements in Electrical Measuring Instruments, of which the following is a specification.

The present invention relates to electrical measuring instruments, and it proposes, in brief, an improved instrument of the general character stated which is so constructed as to enable it to indicate the electrical power at a different point in the circuit from that at which it is introduced thereinto. This result is obtained by an arrangement which permits the addition to the power, at the point of introduction, of all of the losses between that point and the point on the high tension side at which the power is to be ascertained, or which permits, instead, the subtraction of the losses occurring between the aforesaid point of introduction and a predetermined point on the low-tension side. The arrangement in question comprehends a wattmeter, or the like, in which there are employed, in addition to the usual windings, a special winding designed to give a couple proportional to the square of the current intensity, and a second special winding designed to give a couple proportional to the square of the voltage. These two couples must be suitably proportioned, and their action must either be added to, or subtracted from, the ordinary action of the wattmeter.

In the accompanying drawing, Figure 1 indicates diagrammatically a triphase high-tension line, and Fig. 2 indicates diagrammatically a monophase line.

Referring to Fig. 1, the triphase, high-tension line 1, 1, 1 feeds the triphase transformer 2, and through the latter the low-tension line 3, 3, 3. Let it be supposed that the power is to be measured at the points 4, 4, 4 on the high-tension side, and that for certain reasons it is preferable to introduce the instrument on the low-tension side, that is to say, after the transformer.

In applying the present invention to the particular case under consideration, it is proposed to utilize, on the low-tension side, a wattmeter which is so constructed that it will indicate the electrical power, as well as the losses in the transformer 2, with sufficient exactness in view of the ordinarily slight extent of these losses. It may here be stated that the aforesaid losses are of two kinds; one, the losses in the copper, which can be considered as proportional to the square of the secondary current intensity; and the other, the losses in the iron, approximately proportional, to the square of the secondary voltage, owing to the slight variations to which the voltage itself is normally subjected.

If, then:

$Wh$ = the high tension power.
$Wl$ = the low-tension power.
$Wt$ = the total losses in the transformer 2.
$Wi$ = the loss in the iron.
$Wc$ = the loss in the copper.
$V$ = one of the secondary voltage components.
$I$ = one of the secondary current intensities.
$k'$ and $k^2$ = two suitable constants.

And if it be assumed that the losses in the transformer constitute a balanced load, it follows that:

$Wh = Wl + Wt$.
$Wt = Wi + Wc$.
$Wi = k'V^2$.
$Wc = k^2I^2$.

Then, by substitution, $$Wh = Wl + k'V^2 + k^2I^2.$$

The last equation shows that it is possible to measure the power $Wh$ on the high-tension side by means of an instrument capable of adding to the measure of the power $Wl$ on the low-tension side an amount proportional to the square of the secondary voltage, and a second amount proportional to the square of the secondary current intensity. In fact, there can be employed for this purpose, as in Fig. 1, a double wattmeter constructed in accordance with the present invention, and in the particular case under consideration, one of the two current coils 5 of one wattmeter, (ordinarily the fixed one), is completed by a supplemental tension winding 9, while one of the two tension coils 8 of the other wattmeter, (ordinarily the movable one), is completed by a supplemental current winding 10. The supplemental tension winding 9 is shown independent of the principal tension winding 7, in Fig. 1, and the supplemental current winding 10 is shown as provided with a shunt 11. In this way, there is produced a measuring instrument composed of a double wattmeter and two electrodynamometers whose constants can be determined in such a way that the amounts indicated are proportional to the three aforementioned quantities or factors $Wl, k'V^2$, and $k^2I^2$, from which is obtained the power $Wl$.

The case above discussed is only a single instance of the arrangements which can be obtained by applying the present invention. In fact, by its application in different cases, different appliances can be obtained which correspond to various other measuring instruments. For instance, if the above case had involved a monophase line, (Fig. 2), or a triphase balanced load, with the measuring instrument introduced on the low-tension side, as before, there could be employed, instead of a double wattmeter, a single wattmeter with two supplemental coils, i. e., a movable current coil 10 and a fixed tension coil 9, in addition to the ordinary fixed current coil 5 and movable tension coil 6. Such appliance does not consist merely of a wattmeter and two electrodynamometers but includes in addition a second wattmeter which latter is produced by the mutual action of the two supplemental coils; this second wattmeter, however, if properly constructed, will not set up any harmful action, but will simply modify the constant of the principal wattmeter. In like manner, as there are induction wattmeters for balanced or unbalanced alternating circuits, and induction voltmeters and ammeters able to give a torque more or less proportional to the square of the pressure, or current, all such instruments having fixed coils acting on a movable disk or cylinder, the present invention can be applied to them; in such a case a wattmeter, a voltmeter and an ammeter of the induction type would be employed, acting on the same axis so as to obtain a compensated wattmeter.

As regards the electrodynamical instruments, some parts may be dispensed with, using for the voltmeter and ammeter the movable element of the wattmeter and even its fixed coils or some of them and adding only such coils as are necessary. Furthermore, the various parts may be provided with special additional accessories, or they may be suitably divided, in order to control their action. For instance, when a plurality of transformers is included in the circuit, only certain ones of which are actually working, the arrangement can be such that the supplemental coils will act only with relation to the aforesaid working transformers. Instead of being inserted directly in the line, the wattmeter and its supplemental parts may be fed by either voltage or current transformers.

The compensations which have been considered with relation to the losses in the iron and in the copper, may be referred to with relation to different factors or quantities, for instance, losses of power in a distribution line. In this case, in an overhead line, the losses will be proportional to the square of the current, the resistance being considered as constant, while in the case of cables, the losses in the dielectric can readily be determined, since they vary in accordance with the square of the tension. Likewise, in overhead lines of extra high tension, compensation can be made for "corona" losses, which depend upon the tension of the current and can be considered as proportional to the square of the tension. Compensations for losses arising from different causes may even be accumulated when they depend upon the same factor or quantity, voltage or tension. Thus, compensations for losses in a double transformer and in an intermediate line between two transformers may be joined together. Accordingly, it would be possible, in the case of a low-tension generating station which feeds a low-tension receiving station, even through the intermediary of a high-tension transmission line and two transformers, to measure the power at one of the two stations by introducing an instrument at the other station, or even upon the high-tension line.

In general, it is possible to even compensate for mechanical transformations corresponding to losses of power of which the instrument may take account, and the readings or indications given can be changed in accordance with the tension or the voltage, or with other quantities associated with the same.

The instrument, instead of being an indicating or recording wattmeter can also be an integrating wattmeter (watt-hour meter) or other similar appliance acting under the control of the power even if it is not designed to measure the power itself.

I claim:

The herein-described wattmeter comprising two main windings, one fixed and the other movable, forming the ordinary wattmeter couple; and two supplemental windings, one movable and the other fixed, producing variations in the wattmeter measurements, the first-named supplemental winding giving, by the action of the fixed principal winding upon it, variations proportional to the square of the current intensity, while the other supplemental winding gives, by the action of the movable principal winding, variations proportional to the square of the voltage.

In testimony whereof I affix my signature.

GINO CAMPOS.